(12) United States Patent
Kuroumaru

(10) Patent No.: US 8,727,065 B2
(45) Date of Patent: May 20, 2014

(54) ELECTRIC POWER STEERING DEVICE

(75) Inventor: Yoshikazu Kuroumaru, Kashihara (JP)

(73) Assignee: JTEKT Corporation, Osaka-Shi (JP)

( * ) Notice: Subject to any disclaimer, the term of this patent is extended or adjusted under 35 U.S.C. 154(b) by 0 days.

(21) Appl. No.: 13/513,942

(22) PCT Filed: Dec. 22, 2010

(86) PCT No.: PCT/JP2010/073203
§ 371 (c)(1),
(2), (4) Date: Jun. 5, 2012

(87) PCT Pub. No.: WO2011/081076
PCT Pub. Date: Jul. 7, 2011

(65) Prior Publication Data
US 2012/0241246 A1 Sep. 27, 2012

(30) Foreign Application Priority Data

Dec. 28, 2009 (JP) ................................. 2009-298343

(51) Int. Cl.
*B62D 5/04* (2006.01)
*B62D 6/10* (2006.01)

(52) U.S. Cl.
CPC ............ *B62D 5/0403* (2013.01); *B62D 5/0409* (2013.01)
USPC .......................................... 180/443; 180/444

(58) Field of Classification Search
CPC ............................. B62D 5/0403; B62D 5/0409
USPC .......................................... 180/443, 444, 446
See application file for complete search history.

(56) References Cited

U.S. PATENT DOCUMENTS

| 6,705,422 B2 * | 3/2004 | Maekawa ...................... 180/444 |
| 2005/0140224 A1 | 6/2005 | Weigold et al. |
| 2007/0175696 A1 * | 8/2007 | Saito et al. ..................... 180/444 |

FOREIGN PATENT DOCUMENTS

| JP | A-11-34888 | 2/1999 |
| JP | A-2001-213339 | 8/2001 |
| JP | A-2002-127918 | 5/2002 |
| JP | A-2003-63421 | 3/2003 |
| JP | A-2003-252212 | 9/2003 |
| JP | A-2005-35346 | 2/2005 |
| JP | A-2006-88775 | 4/2006 |
| JP | A-2006-520716 | 9/2006 |

OTHER PUBLICATIONS

International Search Report issued in International Patent Application No. PCT/JP2010/073203 dated Mar. 8, 2011 (with translation).

* cited by examiner

*Primary Examiner* — Tony Winner
*Assistant Examiner* — Jacob Knutson
(74) *Attorney, Agent, or Firm* — Oliff PLC

(57) ABSTRACT

An electric power steering device includes a first housing that supports an output shaft rotatable together with a driven member with a first bearing placed there between and a second housing that rotatably supports a driving member. The first housing includes an eccentric engagement section that is eccentric with respect to a first bearing holding section holding the first bearing. The eccentric engagement section is fitted to an engagement section of the second housing. When the center-to-center distance between the driving member and the driven member is adjusted, the eccentric engagement section of the first housing is rotated with respect to the engagement section of the second housing.

5 Claims, 11 Drawing Sheets

US 8,727,065 B2

ELECTRIC POWER STEERING DEVICE

TECHNICAL FIELD

The present invention relates to an electric power steering device.

BACKGROUND ART

A structure to reduce a rattling noise caused by a gear rattle has been proposed in this type of electric power steering device. In detail, an eccentric cam mechanism is disposed at an end of a worm shaft of a decelerator. The rattling noise caused by the gear rattle is reduced by adjusting a backlash between the worm shaft and a worm wheel while increasing or decreasing the center-to-center distance therebetween.

However, the worm shaft is displaced in a direction parallel to the axis of the worm wheel, and therefore, the center position of engagement therebetween deviates. Therefore, variations in tooth contact occur, and therefore, disadvantageously, an operating noise becomes louder, or durability is lowered.

Hence, an electric power steering device of Patent Document 1 has been proposed. The electric power steering device of Patent Document 1 includes, at a lower position in an axial direction of the worm wheel, a pair of bearings that support a lower end of an output shaft and an eccentric bearing holder that supports the pair of bearings. The center-to-center distance therebetween is increased or decreased by moving the lower end of the output shaft and the worm wheel in a radial direction while rotating the eccentric bearing holder.

Additionally, an electric power steering device of Patent Document 2 has been proposed. The electric power steering device of Patent Document 2 includes a worm-shaft-side housing that supports a worm shaft and a motor and includes first and second housings that hold the worm-shaft-side housing between upper and lower sides in an axial direction of a worm wheel. At least one of the first and second housings supports the worm wheel. The electric power steering device of Patent Document 2 additionally includes a backlash adjustment mechanism that adjusts the center-to-center distance between the worm shaft and the worm wheel while relatively moving the worm-shaft-side housing with respect to the first and second housings. In detail, the backlash adjustment mechanism rotates a camshaft having an eccentric cam in a through-hole through which the worm-shaft-side housing and the first and second housings are inserted in parallel with the axial direction of the worm wheel.

PRIOR ART DOCUMENTS

Patent Documents

Patent Document 1: Japanese Published Unexamined Patent Application No. H11-34888
Patent Document 2: Japanese Published Unexamined Patent Application No. 2005-35346

BRIEF SUMMARY OF THE INVENTION

Problems to be Solved by the Invention

In Patent Document 1, generally, output characteristics of a torque sensor that detects steering torque and that is disposed on the upper side in the axial direction of the worm wheel are influenced by the eccentricity. As a result, assist characteristics are influenced, and there is a fear that a steering feeling will deteriorate.

In Patent Document 2, the camshaft that passes through the three housings is provided, and therefore, the structure of the steering device becomes complex. Additionally, the assembly accuracy of many components including the camshaft is required to be improved, and production costs rise. Still additionally, a bearing that supports an output shaft rotated together with the worm wheel cannot be disposed in the worm-shaft-side housing, and therefore, the bearing is disposed in the second housing therebelow. Therefore, the bearing and the worm wheel are apart from each other, and therefore, the supporting accuracy of the worm wheel deteriorates. Therefore, the tooth contact deteriorates, and, as a result, an operating noise becomes louder, or the durability is lowered.

The present invention has been made in consideration of these circumstances, and it is an object of the present invention to provide an electric power steering device that has an excellent steering feeling with a low noise and that is superior in durability.

Means for Solving the Problems

To achieve the object, the present invention provides an electric power steering device, and, according to one aspect, the electric power steering device includes a steering shaft that includes an input shaft connected to a steering member, an output shaft connected to a steerable mechanism, and a torsion bar through which the input shaft and the output shaft are connected together; a torque sensor that detects steering torque loaded onto the steering shaft; an electric motor that is controlled based on an output of the torque sensor; a transmitting mechanism that includes a driving member and a driven member and that decelerates and transmits output rotation of the electric motor to the output shaft; a first bearing that rotatably supports the output shaft; a first housing that supports the first bearing; and a second housing that rotatably supports the driving member; and in the electric power steering device, the driven member is rotatable together with the output shaft; the first housing includes a first bearing holding section that holds the first bearing supporting the output shaft, an eccentric engagement section that is eccentric with respect to the first bearing holding section, and a torque sensor holding section that holds the torque sensor; the torque sensor holding section is concentric with the first bearing holding section; the second housing includes an engagement section fitted to the eccentric engagement section; and the eccentric engagement section of the first housing is arranged to be rotated with respect to the engagement section of the second housing when a center-to-center distance between the driving member and the driven member is adjusted (Claim 1).

In the present invention, when the eccentric engagement section is rotated together with the first housing with respect to the engagement section of the second housing, the center of the driven member supported by the first bearing holding section of the first housing through the output shaft and the center of the driving member supported by the second housing are relatively moved. Therefore, the center-to-center distance can be adjusted, and, as a result, a backlash between the driving member and the driven member can be properly adjusted. At this time, the torque sensor holding section of the first housing is concentric with the first bearing holding section of the first housing, and therefore, the positional relationship between the torque sensor and the output shaft does not change. Therefore, variations in detection performance of the torque sensor are small, and, consequently, an excellent steering feeling can be obtained.

Additionally, the eccentric engagement section of the first housing is fitted to the engagement section of the corresponding second housing, and therefore, other components, such as the camshaft shown in Patent Document 2, can be removed, and the structure can be simplified. Additionally, a limitation, such as that of Patent Document 2, is not imposed on the disposition of the first bearing that supports the output shaft, and the first bearing can be disposed close to the driven member. Therefore, the supporting accuracy of the driven member becomes high, and tooth contact is excellent. As a result, noise reduction can be achieved in cooperation with the backlash adjustment mentioned above, and durability can be improved.

The transmitting mechanism may be a skew gear mechanism, such as a worm gear mechanism that includes a worm shaft serving as a driving member and a worm wheel serving as a driven member. Alternatively, the transmitting mechanism may be a parallel shaft gear mechanism, such as a spur gear mechanism or a helical gear mechanism. Alternatively, the transmitting mechanism may be a belt/pulley mechanism that includes a driving pulley serving as a driving member and a driven pulley serving as a driven member.

Additionally, there is a case in which a second bearing that rotatably supports the output shaft is provided, in which the second housing includes a second bearing holding section that holds the second bearing, and in which a gap that allows the second bearing to move in a radial direction with respect to the second housing when the center-to-center distance is adjusted is formed between the second bearing holding section of the second housing and the second bearing (Claim 2). In this case, when the center-to-center distance is adjusted, the second bearing is allowed to move in the radial direction with respect to the second housing, and therefore, the output shaft never causes resistance between the first bearing and the second bearing. Consequently, the rotational resistance of the output shaft never becomes great. It is recommended to adjust the amount of the gap so as to become equivalent to the amount of adjustment to the center-to-center distance and so as to become extremely slight. An elastic body may be inserted into the gap.

Additionally, there is a case in which a lock member capable of fastening the second bearing to the second bearing holding section is provided (Claim 3). In this case, after adjusting the center-to-center distance, the second bearing can be fastened to the second bearing holding section.

Additionally, there is a case in which a second bearing that rotatably supports the output shaft and a third housing that includes a second bearing holding section that holds the second bearing are provided and in which a gap that allows the second bearing to move in a radial direction with respect to the second housing when the center-to-center distance is adjusted is formed between the second housing and the third housing (Claim 4). In this case, when the center-to-center distance is adjusted, the third housing that holds the second bearing is allowed to move in the radial direction with respect to the second housing, and therefore, the output shaft never causes resistance between the first bearing and the second bearing. Consequently, the rotational resistance of the output shaft never becomes great. It is recommended to adjust the amount of the gap so as to become equivalent to the amount of adjustment to the center-to-center distance and so as to become extremely slight.

Additionally, there is a case in which the first bearing includes an only bearing that directly supports the output shaft (claim 5). In this case, when the center-to-center distance is adjusted, the output shaft can be restrained from causing resistance.

MODES FOR CARRYING OUT THE INVENTION

Embodiments of the present invention will be hereinafter described in detail with reference to the drawings.

Figure 1:
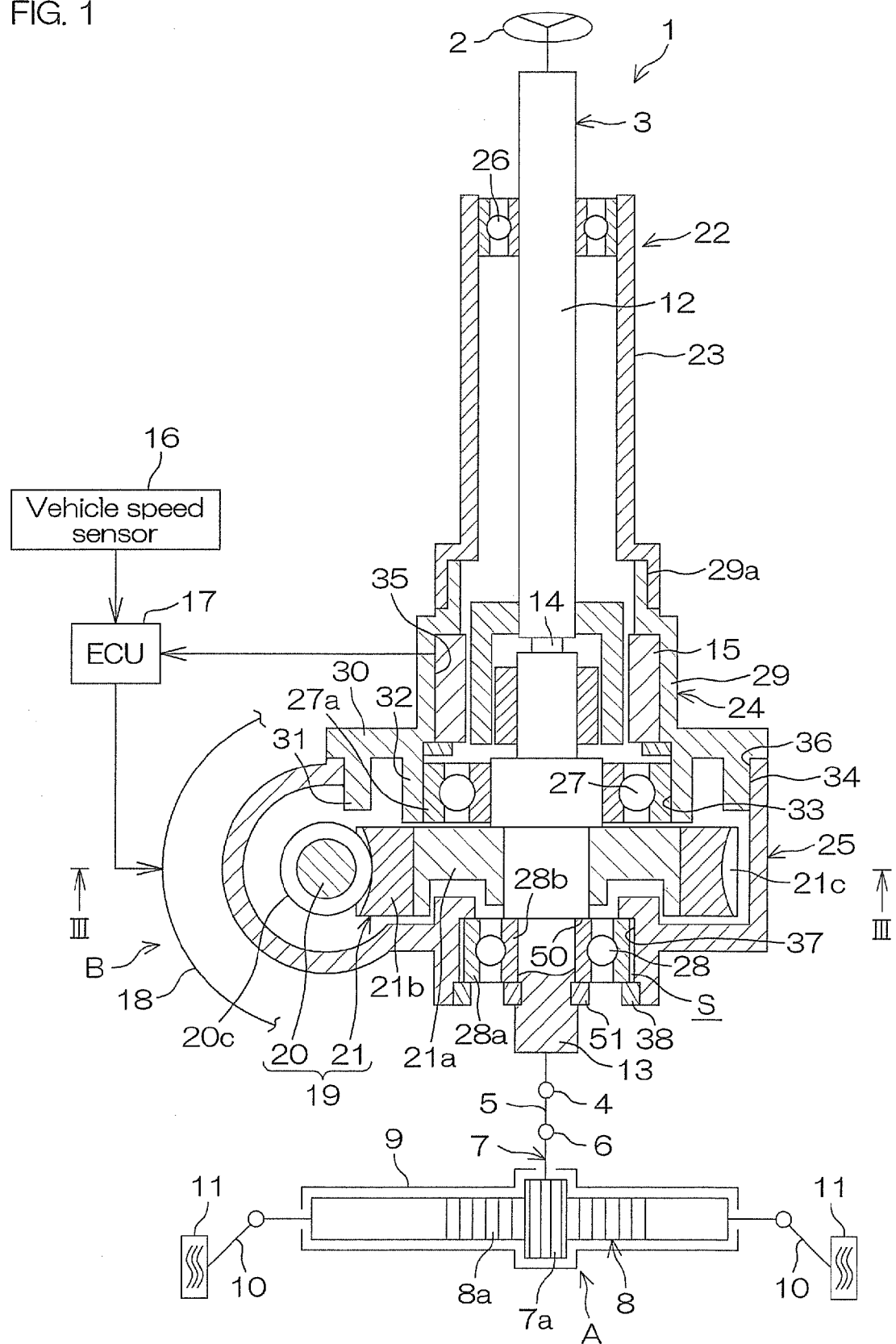
FIG. 1 is a partial cross-sectional schematic view showing a general structure of an electric power steering device according to an embodiment of the present invention.

FIG. 1 a schematic view showing a general structure of an electric power steering device 1 used as a vehicle steering device according to an embodiment of the present invention. Referring to FIG. 1, the electric power steering device 1 includes a steering shaft 3 connected to a steering member 2, such as a steering wheel, an intermediate shaft 5 connected to the steering shaft 3 through a universal joint 4, a pinion shaft 7 connected to the intermediate shaft 5 through a universal joint 6, and a rack shaft 8 serving as a steerable shaft that has a rack 8*a* meshing with a pinion 7*a* disposed near an end of the pinion shaft 7 and that extends in a shaft direction that is the right-left direction of a vehicle. A steerable mechanism "A" that is a rack-and-pinion mechanism consists of the pinion shaft 7 and the rack shaft 8.

The rack shaft 8 is supported so as to be linearly reciprocatable in the shaft direction through a plurality of bearings (not shown) in a housing 9 fixed to a vehicle body. Both ends of the rack shaft 8 protrude to both sides of the housing 9, and a tie rod 10 is joined to each of the ends. Each tie rod 10 is connected to a corresponding steerable wheel 11 through a corresponding knuckle arm (not shown).

When the steering shaft 3 is rotated by operating the steering member 2, its rotation is converted into a rectilinear motion in the shaft direction of the rack shaft 8 by means of the pinion 7a and the rack 8a. As a result, the steering of the steerable wheel 11 is achieved.

The steering shaft 3 includes an input shaft 12 connected to the steering member 2 and an output shaft 13 connected to the intermediate shaft 5. The input shaft 12 and the output shaft 13 are connected together through a torsion bar 14 so as to be relatively rotatable on the same axis. In other words, when steering torque greater than a predetermined value is input to the steering member 2, the input shaft 12 and the output shaft 13 rotate in the same direction while rotating mutually relatively.

Based on the amount of relative rotation displacement of the input and output shafts 12 and 13, a torque sensor 15 disposed around the steering shaft 3 detects steering torque that has been input to the steering member 2. Furthermore, a torque detection result of the torque sensor 15 and a vehicle speed detection result transmitted from a vehicle speed sensor 16 are input to an ECU (Electronic Control Unit) 17 serving as a controller.

The electric power steering device 1 has a steering auxiliary mechanism B. The steering auxiliary mechanism B includes an electric motor 18 that is used to assist steering and a transmitting mechanism 19 that transmits the output torque of the electric motor 18 to the steerable mechanism A. For example, a three-phase brushless motor is used as the electric motor 18.

The transmitting mechanism 19 consists of a worm shaft 20 serving as a driving member and a worm gear mechanism that has a worm wheel 21 serving as a driven member and meshing with a worm 20c of the worm shaft 20. The worm shaft 20 is connected to a rotational shaft of the electric motor 18 through a joint so that torque can be transmitted. The worm wheel 21 is connected to the output shaft 13 of the steering shaft 3 so as to be rotatable together and so as to be immovable in the shaft direction.

When the electric motor 18 rotationally drives the worm shaft 20, the worm wheel 21 is rotationally driven by the worm shaft 20, and the worm wheel 21 and the output shaft 13 rotate together. The rotation of the output shaft 13 is transmitted to the pinion shaft 7 through the intermediate shaft 5. The rotation of the pinion shaft 7 is converted into a movement in the shaft direction of the rack shaft 8. As a result, the steerable wheel 11 is steered. In other words, the worm shaft 20 is rotationally driven by the electric motor 18, and, as a result, the steerable wheel 11 is steered, and a driving person is assisted in steering.

The electric motor 18 is controlled by the ECU 17. Based on a torque detection result transmitted from the torque sensor 15 or based on a vehicle speed detection result, etc., transmitted from the vehicle speed sensor 16, the ECU 17 controllably drives the electric motor 18.

A steering column 22 that rotatably supports the steering shaft 3 includes a tube housing 23, a first housing 24 serving as an eccentric housing that is fitted to a lower end of the tube housing 23, and a second housing 25 that is fitted to the first housing 24.

The tube housing 23 rotatably supports the input shaft 12 at its upper end through a bearing 26. A first bearing 27 and a second bearing 28 that rotatably support the output shaft 13 are disposed on both sides between which the worm wheel 21 is held up and down (in the axial direction), respectively. The bearing 26, the first bearing 27, and the second bearing 28 are each an antifriction bearing such as a ball bearing.

The first housing 24 includes a cylindrical section 29 coaxially fitted to the lower end of the tube housing 23, an annular plate 30 orthogonally connected to a lower end of the cylindrical section 29, a cylindrical projection 31 that extends downwardly from near the outer periphery of the annular plate 30, and a cylindrical projection 32 that is formed inside the cylindrical projection 31 in the radial direction and that extends downwardly from the annular plate 30.

The first housing 24 additionally includes a first bearing holding section 33 that holds an outer ring 27a of the first bearing 27 rotatably supporting the output shaft 13, an eccentric engagement section 34 that is eccentric with respect to the first bearing holding section 33, and a torque sensor holding section 35 that holds the torque sensor 15. The first housing 24 rotatably supports the output shaft 13 through the first bearing 27 held by the first bearing holding section 33.

The upper end of the cylindrical section 29 of the first housing 24 is reduced in diameter, and an engagement section 29a that is fitted to the inner periphery of the lower end of the tube housing 23 is formed on the outer periphery of the upper end of the cylindrical section 29. The torque sensor holding section 35 is disposed on the inner periphery of the cylindrical section 29 of the first housing 24. The first bearing holding section 33 is disposed on the inner periphery of the cylindrical projection 32, and the eccentric engagement section 34 is disposed on the outer periphery of the cylindrical projection 31.

Figure 2:
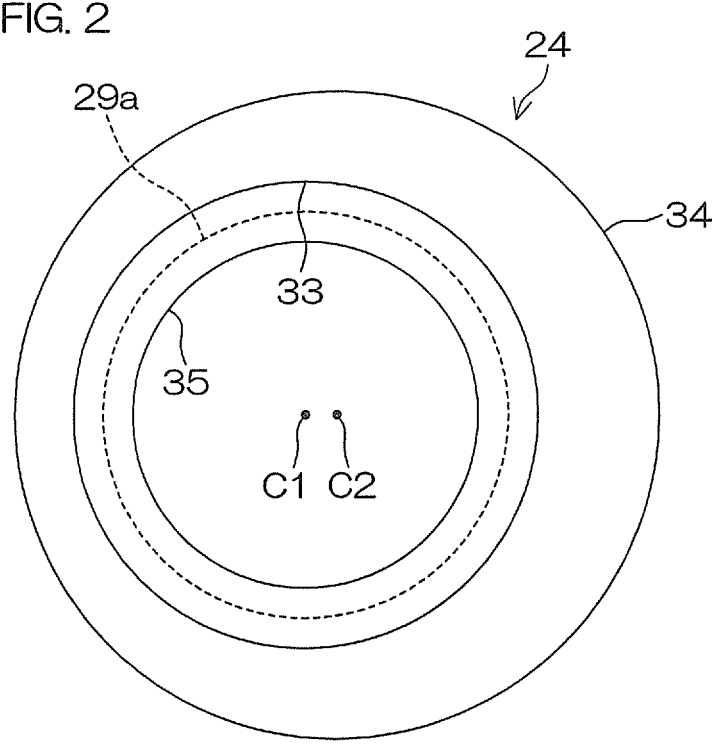
FIG. 2 is a schematic view showing a relationship among the center position of a bearing holding section, that of a torque sensor holding section, and that of an eccentric engagement section in a first housing of FIG. 1.

As shown in FIG. 2 that is a schematic view, the engagement section 29a, the torque sensor holding section 35, and the first bearing holding section 33 are formed into concentric cylindrical planes having a common center C1. The eccentric engagement section 34 is formed into a cylindrical plane that is eccentric with respect to the first bearing holding section 33. In other words, a center C2 of the eccentric engagement section 34 is offset by a predetermined amount from the center C1 of the first bearing holding section 33 and from that of the torque sensor holding section 35. Preferably, the direction in which the center C2 of the eccentric engagement section 34 is offset is a direction perpendicular to both of the central axis of the worm shaft 20 and the central axis of the worm wheel 21.

The second housing 25 includes an engagement section 36 that is fittable to the eccentric engagement section 34 of the first housing 24 and a second bearing holding section 37 that holds the second bearing 28. The engagement section 36 and the second bearing holding section 37 are formed into cylindrical planes, respectively, that are eccentric with respect to each other. The inner diameter of the second bearing holding section 37 is slightly greater than the outer diameter of an outer ring 28a of the second bearing 28. Therefore, it is possible to provide a gap S between the second bearing holding section 37 and the outer ring 28a of the second bearing 28. The gap S allows the second housing 25 to move in the radial direction of the second bearing 28 when the center-to-center distance D between the worm shaft 20 and the worm wheel 21 is adjusted, i.e., when a backlash is adjusted between the worm shaft 20 and the worm wheel 21.

A lock member 38 is provided that is used to fix the outer ring 28a of the second bearing 28 to the second bearing holding section 37 by being screwed to a screw section contiguous to the second bearing holding section 37 and by pressing an end surface of the outer ring 28a of the second bearing 28. The lock member 38 is loosened when the backlash is adjusted, and the lock member 38 is tightened when the backlash finishes being adjusted.

The inner ring 28b of the second bearing 28 is fitted to the output shaft 13 so as to be relatively unrotatable. The inner ring 28b of the second bearing 28 is sandwiched between a stepped part 50 of the output shaft 13 and a retaining ring 51 engaged with an outer periphery groove of the output shaft 13, and therefore, the second bearing 28 and the output shaft 13 are restrained from relatively moving in the shaft direction, and, as a result, the output shaft 13 is restrained from moving in the shaft direction.

The worm wheel 21 includes an annular cored bar 21a joined to the output shaft 13 so as to be rotatable together and a synthetic resin member 21b that surrounds the cored bar 21a and that has a toothed part 21c on its outer periphery. The cored bar 21a is inserted into a metal mold, for example, when the resin of the synthetic resin member 21b is molded.

Figure 3:
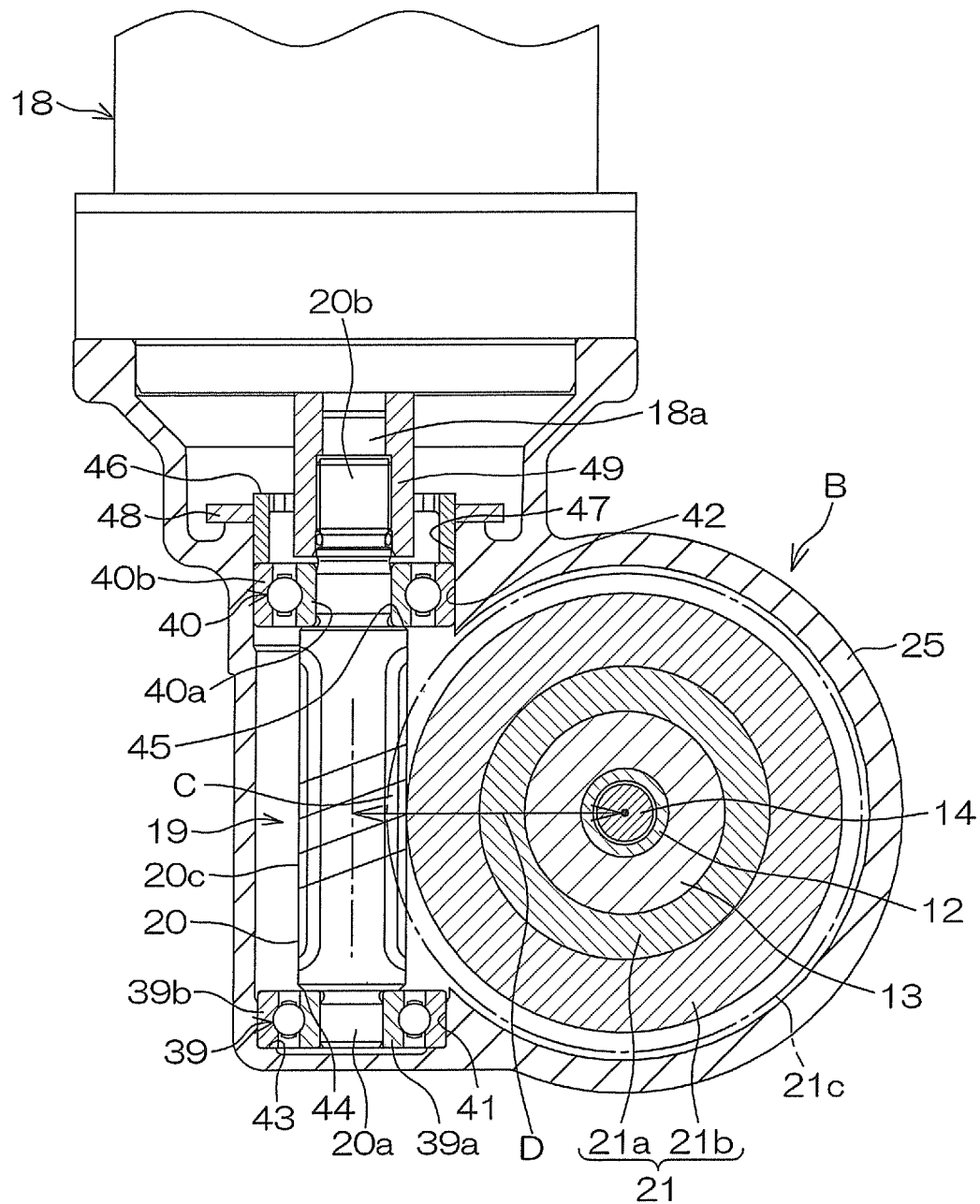
FIG. 3 is a sectional view along line of FIG. 1.

Next, referring to FIG. 3, an end 20a and an opposite end 20b of the worm shaft 20 are rotatably supported by a pair of bearings 39 and 40, respectively, that are held by the second housing 25. Inner rings 39a and 40a of the pair of bearings 39 and 40 are fitted to corresponding constricted parts of the worm shaft 20, respectively. Outer rings 39b and 40b of the pair of bearings 39 and 40 are held by bearing holding sections 41 and 42 of the second housing 25, respectively.

The outer ring 39b of the bearing 39 that supports the end 20a of the worm shaft 20 comes into contact with the stepped part 43 of the second housing 25 and is positioned. On the other hand, the inner ring 39a of the bearing 39 comes into contact with a positioning stepped part 44 of the worm shaft 20, thereby being restrained from moving toward the opposite end 20b. The inner ring 40a of the bearing 40 that supports the neighborhood of the opposite end 20b (i.e., joint-side end) of the worm shaft 20 comes into contact with the positioning stepped part 45 of the worm shaft 20, thereby being restrained from moving toward the end 20a.

The outer ring 40b of the bearing 40 is urged toward the bearing 39 by means of a screw member 46 used to adjust a preload. The screw member 46 is screwed into a screw hole 47 formed in the second housing 25, and hence applies a preload to the pair of bearings 39 and 40, and positions the worm shaft 20 in the shaft direction. A lock nut 48 is a nut that is engaged with the screw member 46 in order to fasten the screw member 46 that has finished the preload adjustment.

The opposite end 20b of the worm shaft 20 is connected to the rotational shaft 18a of the electric motor 18 through, for example, a spline joint 49 so as to transmit torque.

According to the present embodiment, when the first housing 24 is rotated with respect to the second housing 25 in a state in which the lock member 38 has been loosened, the center of the worm wheel 21 supported by the first bearing holding section 33 of the first housing 24 through the output shaft 13 and the center of the worm shaft 20 supported by the second housing 25 through the bearings 39 and 40 are relatively moved in response to the rotation of the eccentric engagement section 34 of the first housing 24. Therefore, the center-to-center distance D between the worm shaft 20 and the worm wheel 21 can be adjusted, and, as a result, a backlash between tooth surfaces between the worm shaft 20 and the worm wheel 21 can be properly adjusted. After adjusting the backlash, the outer ring 28a of the second bearing 28 is fastened to the second bearing holding section 37 of the second housing 25 by tightening the lock member 38.

The torque sensor holding section 35 of the first housing 24 is concentric with the first bearing holding section 33 of the first housing 24, and therefore, the positional relationship between the torque sensor 15 and the output shaft 13 does not change even if the first housing 24 is rotated and displaced. Therefore, variations in detection performance of the torque sensor 15 are small, and, consequently, an excellent steering feeling can be obtained through the obtaining of stable assist performance.

The eccentric engagement section 34 of the first housing 24 is fitted to the corresponding engagement section 36 of the second housing 25. In other words, the housings 24 and 25 are directly fitted together, and therefore, other components, such as the camshaft shown in Patent Document 2, can be removed, and the structure can be simplified. Additionally, a limitation, such as that of Patent Document 2, is not imposed on the disposition of the bearing that supports the output shaft 13, and the first bearing 27 can be disposed close to the worm wheel 21. Therefore, the supporting accuracy of the worm wheel 21 is high, and tooth contact is excellent, and, as a result, noise reduction can be achieved in cooperation with the backlash adjustment mentioned above, and durability can be improved.

The second bearing 28 is disposed so as to face the first bearing 27 with the worm wheel 21 placed therebetween in the shaft direction of the output shaft 13. Furthermore, an arrangement is made so as to create a gap S that allows the second bearing 28 to move in the radial direction with respect to the second bearing holding section 37 of the second housing 25 when the center-to-center distance D is adjusted. Therefore, regardless of an adjustment to the center-to-center distance D, the output shaft 13 never causes resistance between the first bearing 27 and the second bearing 28, and, consequently, the rotational resistance of the output shaft 13 never becomes great. It is recommended to adjust the amount of the gap S so as to become equivalent to the amount of adjustment to the center-to-center distance D (for example, several tens of micrometers (μm) or so), i.e., so as to become extremely slight.

Figure 4:
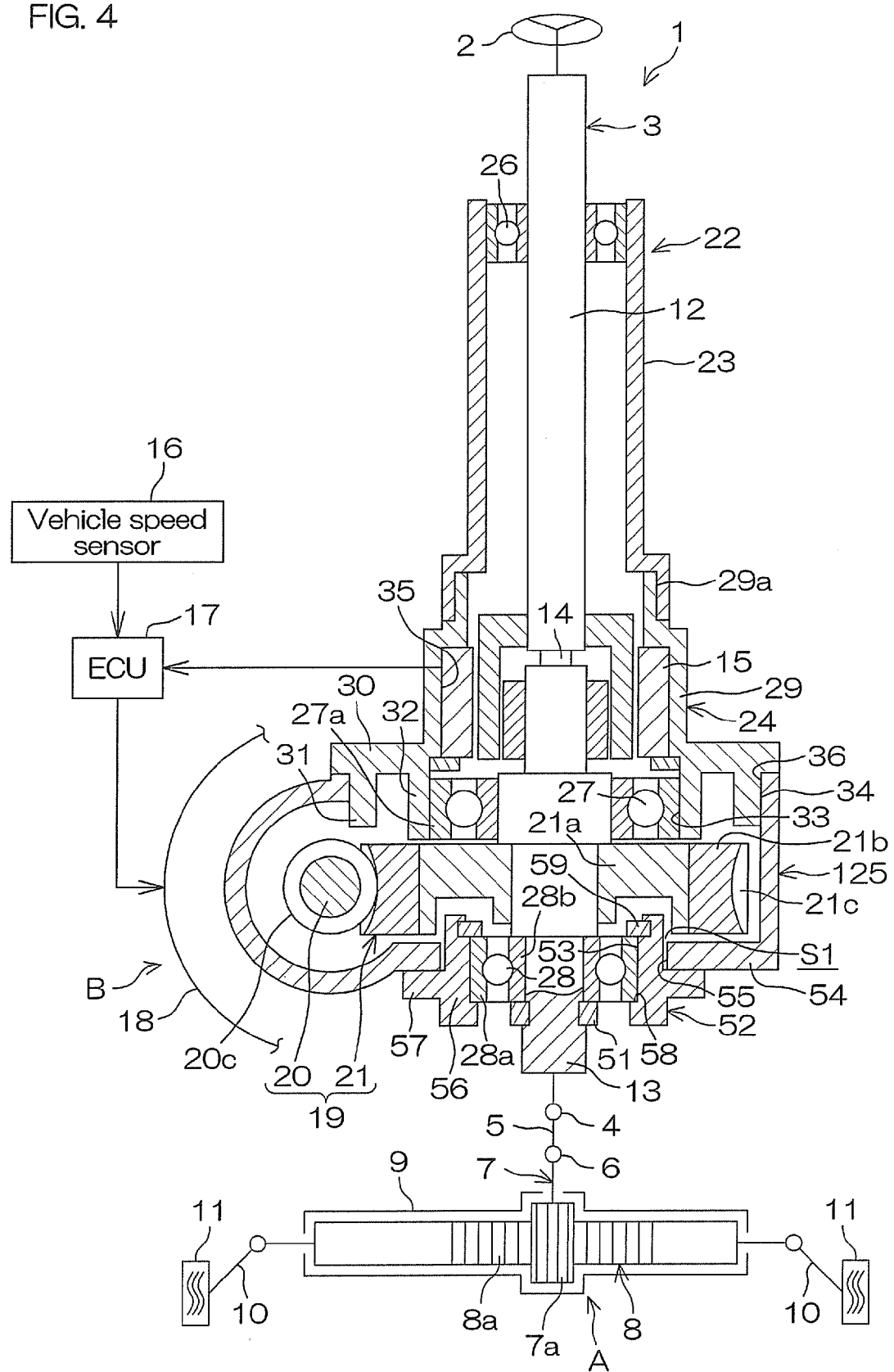
FIG. 4 is a partial cross-sectional schematic view showing a general structure of an electric power steering device according to another embodiment of the present invention.

Next, FIG. 4 shows another embodiment of the present invention. Referring to FIG. 4, differences between the present embodiment and the embodiment of FIG. 1 are as follows. In detail, a third housing 52 that functions as an end housing connected to a bottom of a second housing 125 is provided, and the second bearing 28 is held by a second bearing holding section 53 disposed in the third housing 52. Additionally, a gap S1 that allows the second bearing 28 to move in the radial direction with respect to the second housing 125 when the center-to-center distance between the worm shaft 20 and the worm wheel 21 is adjusted is formed between the second housing 125 and the third housing 52.

Figure 5:
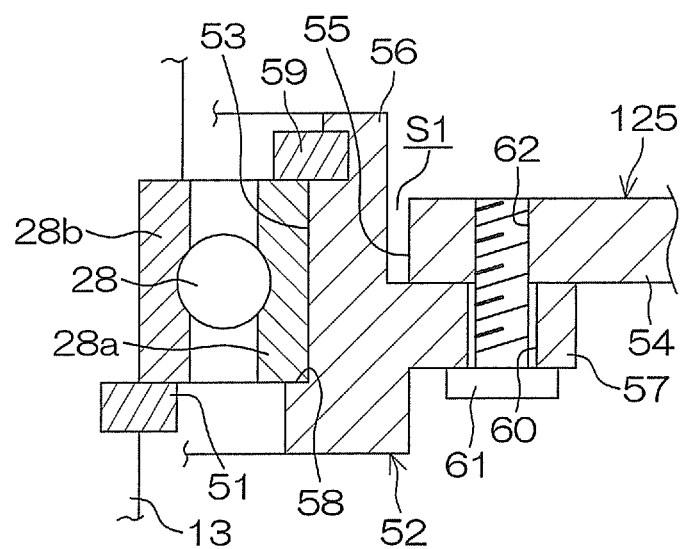
FIG. 5 is an enlarged view of a main part of the electric power steering device of FIG. 4.

Referring to FIG. 4 and FIG. 5 that is an enlarged view, a through-hole 55 is formed in a bottom wall 54 of the second housing 125. The third housing 52 includes a cylindrical section 56 inserted through the through-hole 55 and an annular plate 57 that extends outwardly in the radial direction from the outer periphery of the cylindrical section 56 and that is disposed along the bottom wall 54.

The second bearing holding section 53 is disposed on the inner periphery of the cylindrical section 56 of the third housing 52. The outer ring 28a of the second bearing 28 fitted to the second bearing holding section 53 is sandwiched between a stepped part 58 formed on the inner periphery of the cylindrical section 56 and a retaining ring 59 engaged with an inner periphery groove of the cylindrical section 56, and the outer ring 28a is restrained from moving in the shaft direction.

The inner diameter of the through-hole 55 of the second housing 125 is greater by a predetermined amount than the outer diameter of the cylindrical section 56 of the third housing 52, and the gap S1 mentioned above is provided between the inner periphery of the through-hole 55 and the outer periphery of the cylindrical section 56.

In the second housing 125, the engagement section 36 fitted to the eccentric engagement section 34 of the first housing 24 and the inner periphery of the through-hole 55 are formed into cylindrical planes, respectively, that are eccentric with respect to each other. In the third housing 52, the second bearing holding section 53 and the outer periphery of the cylindrical section 56 are formed into concentric cylindrical planes, respectively.

As shown in FIG. 5, a fixing screw 61 that is loosely fitted to a screw through-hole 60 formed in the third housing 52 is screwed into a screw hole 62 formed in the bottom wall 54 of the second housing 125, and, as a result, the second housing 125 and the third housing 52 are fixed together.

Likewise, in the present embodiment, the same operational effect as in the embodiment of FIG. 1 can be fulfilled. Before adjusting the center-to-center distance while rotating the first housing 24 that is an eccentric housing, the fixing screw 61 is loosened so that the gap S1 allows the second housing 125 and the third housing 52 to move relatively. Therefore, regardless of an adjustment to the center-to-center distance, the output shaft 13 never causes resistance between the first bearing 27 and the second bearing 28, and, consequently, the rotational resistance of the output shaft 13 never becomes great. It is recommended to adjust the amount of the gap S1 so as to become equivalent to the amount of adjustment to the center-to-center distance (for example, several tens of micrometers (μm) or so), i.e., so as to become extremely slight. After adjusting the center-to-center distance, the third housing 52 is fastened to the second housing 125 by means of the fixing screw 61.

Figure 6:
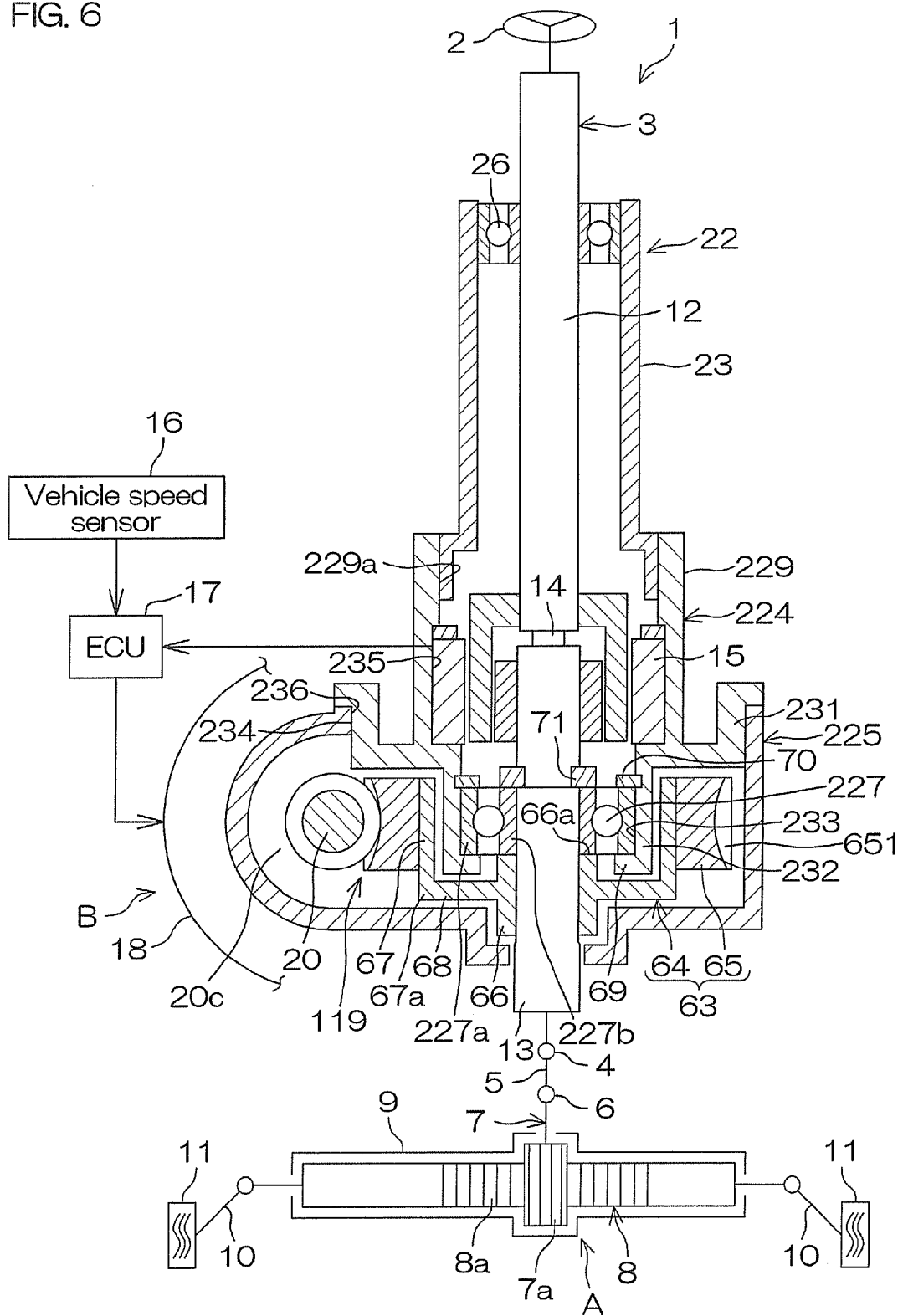
FIG. 6 is a partial cross-sectional schematic view showing a general structure of an electric power steering device according to still another embodiment of the present invention.
Figure 7:
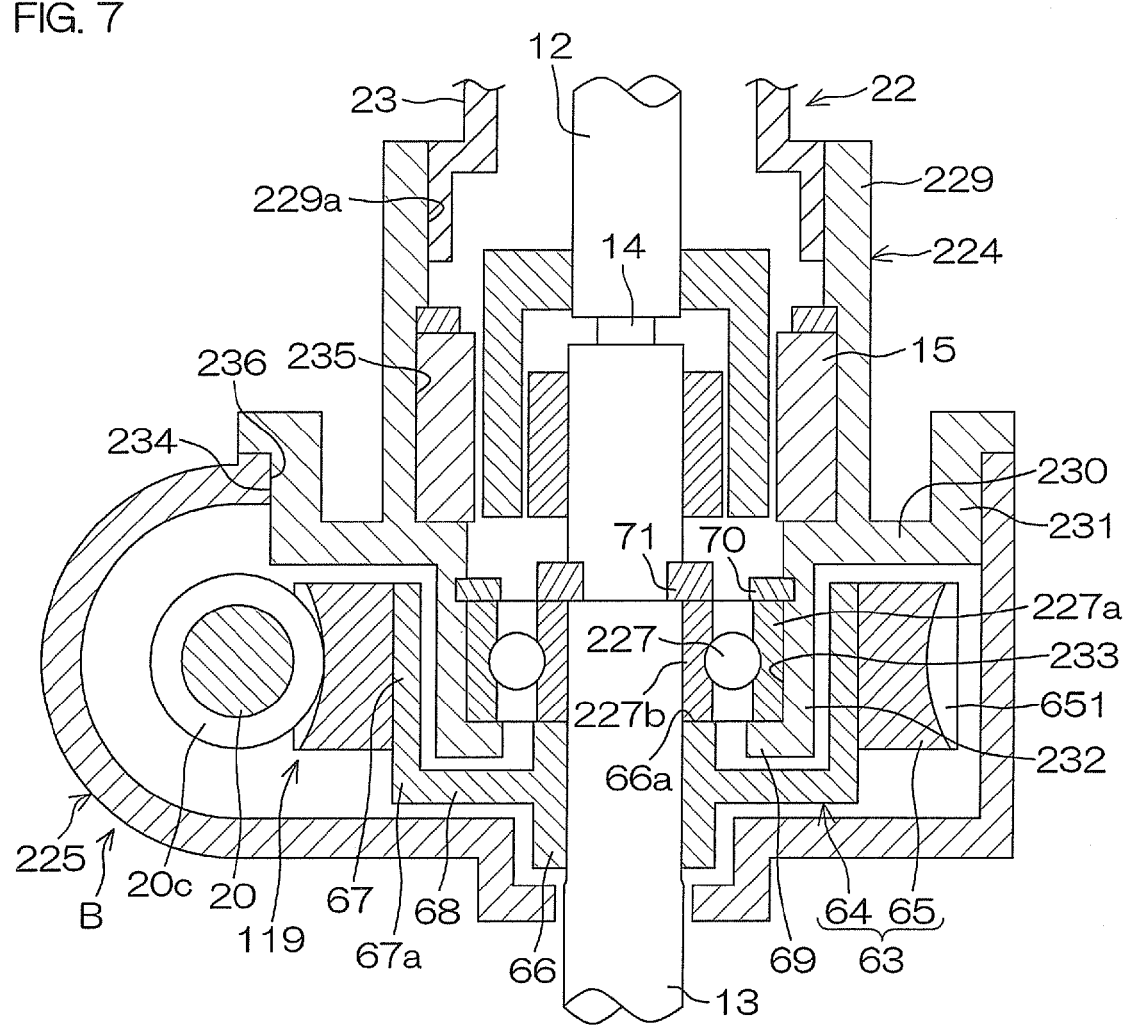
FIG. 7 is an enlarged view of a main part of the electric power steering device of FIG. 6.
Figure 8:
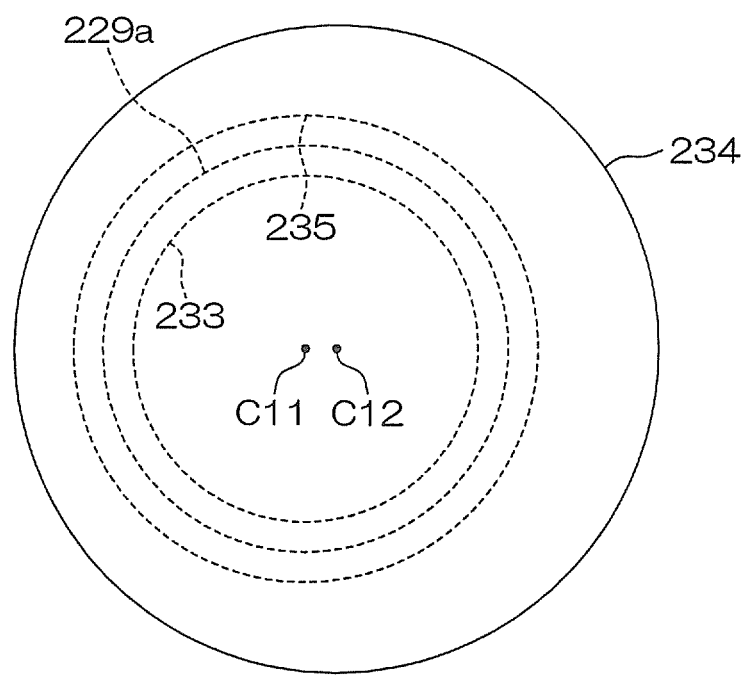
FIG. 8 is a schematic view showing a relationship among the center position of a bearing holding section, that of a torque sensor holding section, and that of an eccentric engagement section in a first housing of FIG. 6.

Next, FIG. 6 to FIG. 8 show still another embodiment of the present invention. Differences between the present embodiment and the embodiment of FIGS. 1 and 3 are as follows. In detail, in the embodiment of FIGS. 1 and 3, the output shaft 13 is supported at its both sides by the first and second bearings 27 and 28 between which the worm wheel 21 is interposed. Additionally, the first bearing 27 is held by the first bearing holding section 33 of the first housing 24 that is an eccentric housing. Additionally, as shown in FIG. 1, the second bearing 28 is held by the second bearing holding section 37 of the second housing 25 that supports the worm shaft 20, or, as in FIG. 3, is held by the second bearing holding section 53 of the third housing 52 connected to the second housing 125.

On the other hand, in the present embodiment, as shown in FIG. 6 and FIG. 7 that is an enlarged view, only the first bearing 227 supported by the first bearing holding section 233 of the first housing 224 that is an eccentric housing is the bearing that directly supports the output shaft 13. Additionally, the first bearing 227 is disposed inside the synthetic resin member 65 of the worm wheel 63 of the transmitting mechanism 119 in the radial direction, and, with respect to the shaft direction of the output shaft 13, the center position of the synthetic resin member 65 and the center position of the first bearing 227 are arranged to coincide with each other or substantially coincide with each other.

In more detail, the first housing 224 includes a cylindrical section 229 coaxially fitted to the lower end of the tube housing 23, an annular plate 230 orthogonally connected to the lower end of the cylindrical section 229, a cylindrical projection 231 that extends upwardly from near the outer periphery of the annular plate 230, and a cylindrical projection 232 that extends downwardly from the inner periphery of the annular plate 230.

An engagement section 229a fitted to the outer periphery of the lower end of the tube housing 23 is disposed on the inner periphery of the upper end of the cylindrical section 229, and a torque sensor holding section 235 is disposed on the inner periphery of the cylindrical section 229. A first bearing holding section 233 that holds an outer ring 227a of the first bearing 227 is disposed on the inner periphery of the cylindrical projection 232.

An eccentric engagement section 234 that is eccentric with respect to the first bearing holding section 233 is disposed on the outer periphery of the cylindrical projection 231, and an engagement section 236 disposed, on the inner periphery of the upper end of the second housing 225 is fitted to the eccentric engagement section 234.

As shown in FIG. 8 that is a schematic view, the engagement section 229a, the torque sensor holding section 235, and the first bearing holding section 233 are formed into concentric cylindrical planes, respectively, that have a common center C11, and the eccentric engagement section 234 is formed into a cylindrical plane having a center C12 that is offset by a predetermined amount with respect to the center C11.

The worm wheel 63 includes an annular cored bar 64 joined to the output shaft 13 so as to be rotatable together and the annular synthetic resin member 65 that surrounds the cored bar 64 and that has a toothed part 651 on its outer periphery The cored bar 64 is inserted into a metal mold, for example, when the resin of the synthetic resin member 65 is molded.

The cored bar 64 includes an inner cylinder 66 that is fitted and fixed to the outer periphery of the output shaft 13, an outer cylinder 67 that is fitted and fixed to the inner periphery of the synthetic resin member 65, and an annular connection part 68 by which an end (lower end) 67a of the outer cylinder 67 and the inner cylinder 66 are connected together. The cylindrical projection 232 of the first housing 224 is disposed inside the outer cylinder 67 in the radial direction.

The outer ring 227a of the first bearing 227 is sandwiched between an annular flange 69 that extends inwardly from one end of the cylindrical projection 232 in the radial direction and a retaining ring 70 engaged with an inner periphery groove of the cylindrical projection 232, and therefore, the first bearing 227 is restrained from moving in the shaft direction. The inner ring 227b of the first bearing 227 is sandwiched between an end surface 66a of the inner cylinder 66 of the cored bar 64 and a retaining ring 71 engaged with the outer periphery groove of the output shaft 13, and therefore, the first bearing 227 is restrained from moving in the shaft direction with respect to the output shaft 13.

Likewise, in the present embodiment, the same operational effect as in the embodiment of FIG. 1 can be fulfilled. In detail, the center-to-center distance between the worm shaft 20 and the worm wheel 63 can be adjusted by rotating the first housing 224 that is an eccentric housing with respect to the second housing 225. As a result, a backlash between tooth surfaces between the worm shaft 20 and the worm wheel 63 can be properly adjusted. Additionally, the first bearing 227 that directly supports the output shaft 13 is arranged to be the only bearing, and therefore, when the center-to-center distance is adjusted, the output shaft 13 is restrained from causing resistance.

Additionally, the positional relationship between the torque sensor 15 and the output shaft 13 does not change regardless of an adjustment to the center-to-center distance, and therefore, variations in detection performance of the torque sensor 15 are small, and, consequently, an excellent steering feeling can be obtained through the obtaining of stable assist performance.

Additionally, the first bearing 227 is disposed inside the synthetic resin member 65 of the worm wheel 63 in the radial direction, and, with respect to the shaft direction of the output shaft 13, the center position of the synthetic resin member 65 and the center position of the first bearing 227 are arranged to coincide with each other or substantially coincide with each other. Therefore, the electric power steering device 1 can be reduced in size in the shaft direction. Moreover, the supporting accuracy of the worm wheel 63 can be heightened, and tooth contact becomes excellent. As a result, noise reduction can be achieved in cooperation with the backlash adjustment mentioned above, and durability can be improved.

When the supporting center (bearing center) of the first bearing 27 is located more inwardly in the radial direction than the meshing center between the worm shaft 20 and the worm wheel 21, the operating point of torque variation caused when the worm shaft 20 and the worm wheel 21 mesh with each other coincides with the supporting center of the first bearing 27. Therefore, the output shaft 13 can be completely restrained from swinging, and a deviation in the meshing position and an abnormal shake can be reliably prevented, and, as a result, a smooth steering assisting force can be transmitted while always maintaining a proper backlash.

Figure 9:
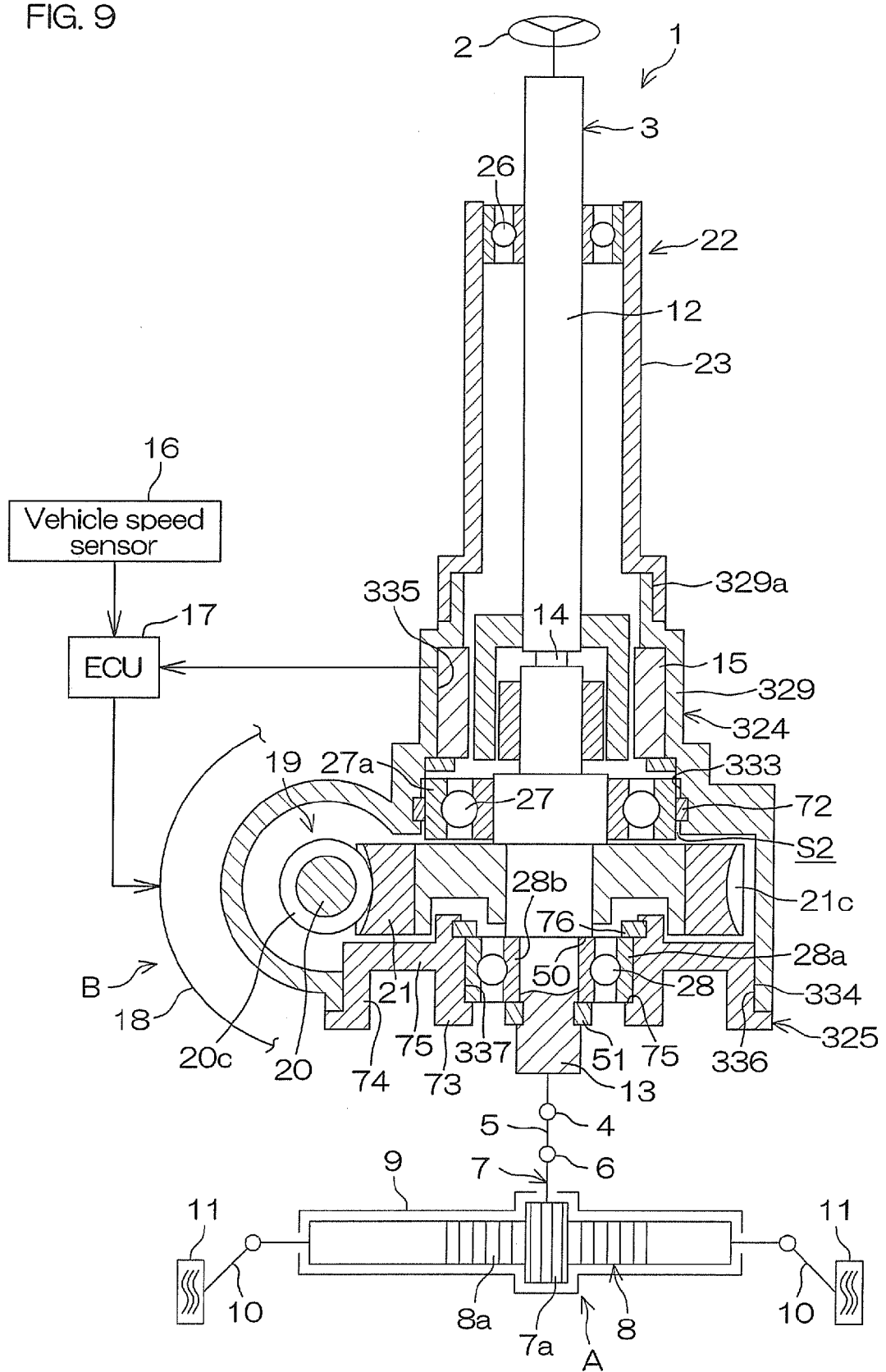
FIG. 9 is a partial cross-sectional schematic view showing a general structure of an electric power steering device according to a reference example of the present invention.

Next, FIG. 9 shows a reference example of the present invention. Referring to FIG. 9, the main difference between the present reference example and the embodiment of FIG. 1 is that a first housing 324 and a second housing 325 connected to a lower part of the first housing 324 are provided and that the second housing 325 is an eccentric housing that has an eccentric engagement section 334.

The first housing 324 includes an engagement section 329a of a cylindrical section 329 fitted to the tube housing 23, a torque sensor holding section 335 that holds the torque sensor 15, and a first bearing holding section 333 that holds the first bearing 27, which are mutually-concentric cylindrical planes. The first housing 324 has an engagement section 336 that is fitted to the eccentric engagement section 334 of the second housing 325 and that is a cylindrical plane being eccentric with respect to the mutually-concentric cylindrical planes.

A gap S2 that allows the first bearing 27 to move in the radial direction with respect to the first bearing holding section 333 when the center-to-center distance between the worm shaft 20 and the worm wheel 21 is adjusted is formed between the first bearing holding section 333 and the outer periphery of the outer ring 27a of the first bearing 27. An annular elastic member 72 is interposed in an elastically compressed state between the first bearing holding section 333 and the outer periphery of the outer ring 27a of the first bearing 27. The elastic member 72 prevents the first bearing 27 from rattling or shaking in the first bearing holding section 333, and prevents the occurrence of a noise resulting from the rattling or shaking.

The first housing 324 extends to the lower side of the worm shaft 20, and the engagement section 336 is disposed on the inner periphery of an extended end of the first housing 324 so as to be eccentric with respect to the engagement section 329a.

The second housing 325 includes an inner cylinder 73, an outer cylinder 74, and a connection wall 75 through which the inner cylinder 73 and the outer cylinder 74 are connected together. A second bearing holding section 337 that holds the second bearing 28 is formed on the inner periphery of the inner cylinder 73, and the eccentric engagement section 334 that is eccentric with respect to the second bearing holding section 337 is formed on the outer periphery of the outer cylinder 74. The outer ring 28a of the second bearing 28 is sandwiched between a retaining ring 77 and a stepped part 76 formed on the inner periphery of the inner cylinder 73, and, as a result, the second bearing 28 is restrained from moving in the shaft direction with respect to the second housing 325.

In FIG. 9, the same reference numeral as in the embodiment of FIG. 1 is given to the same component as in the embodiment of FIG. 1.

According to the present reference example, when the second housing 325 that is an eccentric housing is rotated with respect to the first housing 324, the shaft core of the worm shaft 20 supported by the first housing 324 and the shaft core of the worm wheel 21 supported by the second housing 325 through the second bearing 28 are relatively moved in response to the rotation of the eccentric engagement section 334 of the second housing 325. Therefore, the center-to-center distance between the worm shaft 20 and the worm wheel 21 can be adjusted, and, as a result, a backlash between tooth surfaces between the worm shaft 20 and the worm wheel 21 can be properly adjusted.

Additionally, an arrangement is made so as to create a gap S2 that allows the first bearing 27 to move in the radial direction with respect to the first bearing holding section 333 of the first housing 324 when the center-to-center distance is adjusted. Therefore, regardless of an adjustment to the center-to-center distance, the output shaft 13 never causes prying resistance between the first bearing 27 and the second bearing 28. Consequently, the rotational resistance of the output shaft 13 never becomes great. It is recommended to adjust the amount of the gap S2 so as to become equivalent to the amount of adjustment to the center-to-center distance (for example, several tens of micrometers (μm) or so), i.e., so as to become extremely slight.

The positional relationship between the torque sensor 15 held by the torque sensor holding section 335 and the output shaft 13 is slightly changed in response to an adjustment to the center-to-center distance. However, the torque sensor 15 can be made to become unsusceptible to eccentricity by using, for example, a Hall IC or another noncontact sensor as the torque sensor 15. Consequently, an excellent steering feeling can be obtained through the obtaining of stable assist performance.

Figure 10:
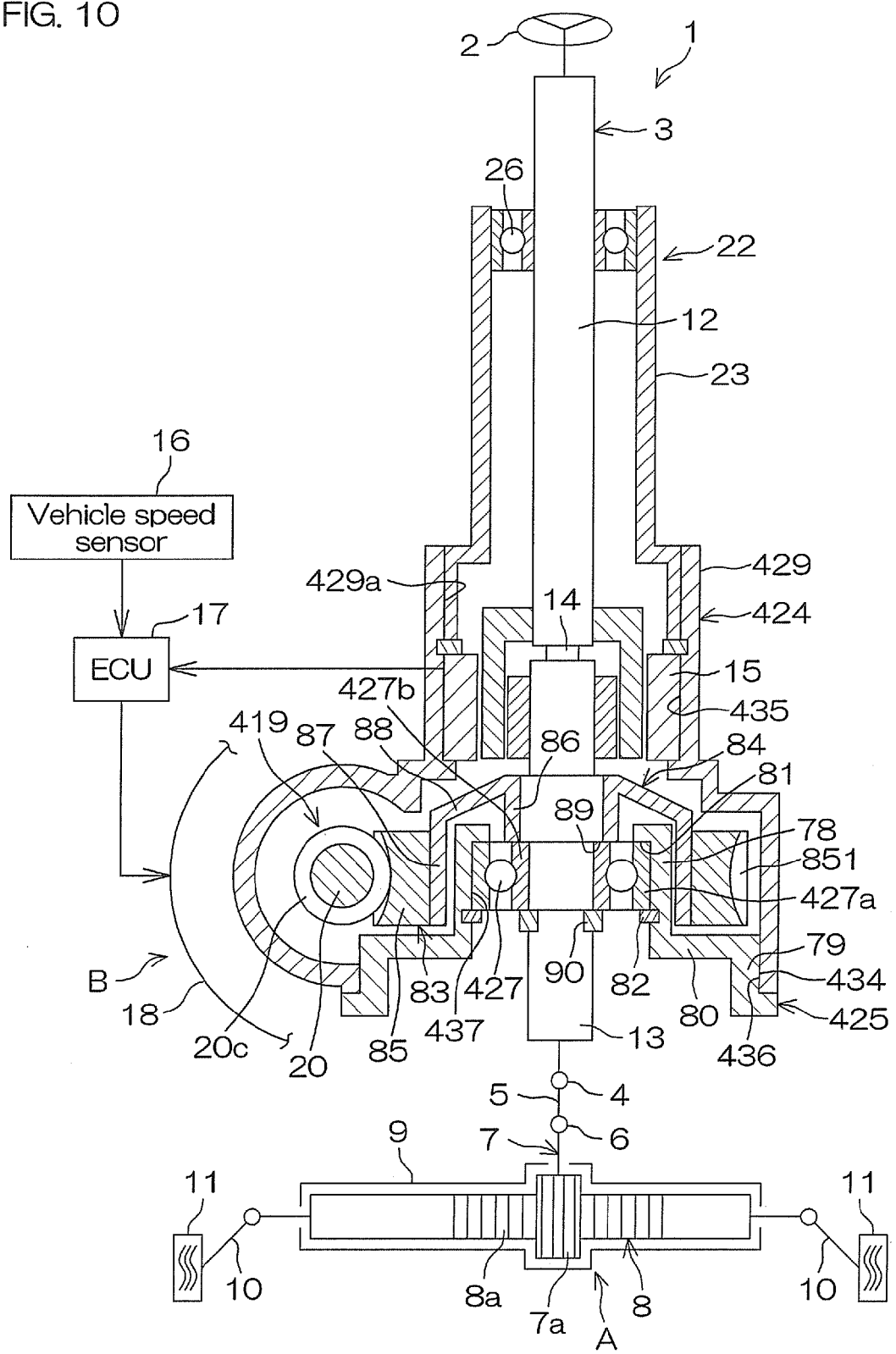
FIG. 10 is a partial cross-sectional schematic view showing a general structure of an electric power steering device according to another reference example of the present invention.

Next, FIG. 10 shows still another reference example of the present invention. Referring to FIG. 10, the main difference between the present reference example and the embodiment of FIG. 6 is that a first housing 424 and a second housing 425 connected to a lower part of the first housing 424 are provided and that the second housing 425 is an eccentric housing that has an eccentric engagement section 434.

The first housing 424 includes an engagement section 429a of a cylindrical section 429 fitted to the tube housing 23 and a torque sensor holding section 435 that holds the torque sensor 15, which are mutually-concentric cylindrical planes. The first housing 424 additionally includes an engagement section 436 that is fitted to an eccentric engagement section 434 of the second housing 425 and that is a cylindrical plane being eccentric with respect to the mutually-concentric cylindrical planes.

The first housing 424 extends to the lower side of the worm shaft 20, and the engagement section 436 is disposed on the inner periphery of an extended end of the first housing 424 so as to be eccentric with respect to the engagement section 429a.

The second housing 425 includes a small cylinder 78 and a large cylinder 79 that extend in mutually opposite directions in the shaft direction and a connection wall 80 through which the small cylinder 78 and the large cylinder 79 are connected together. A second bearing holding section 437 that holds a first bearing 427 is formed on the inner periphery of the small cylinder 78. The eccentric engagement section 434 that is eccentric with respect to a first bearing holding section 433 is formed on the outer periphery of the large cylinder 79. An outer ring 427a of the first bearing 427 is sandwiched between a retaining ring 82 and a stepped part 81 formed on the inner periphery of the small cylinder 78. As a result, the first bearing 427 is restrained from moving in the shaft direction with respect to the second housing 425.

The worm wheel 83 of a transmitting mechanism 419 includes an annular cored bar 84 joined to the output shaft 13 so as to be rotatable together and the annular synthetic resin member 85 that surrounds the cored bar 84 and that has a toothed part 851 on its outer periphery. The cored bar 84 is inserted into a metal mold, for example, when the resin of the synthetic resin member 85 is molded.

The cored bar 84 includes a small cylinder 86 and a large cylinder 87 that extend mutually toward the same side in the shaft direction and an annular connection wall 88 through which mutually opposite ends of the small and large cylinders 86 and 87 are connected together. The small cylinder 86 is fitted to the outer periphery of the output shaft 13 so as to be rotatable together. The large cylinder 87 is fitted and fixed to the inner periphery of the synthetic resin member 85. The small cylinder 78 of the second housing 425 is disposed inside the large cylinder 87 of the cored bar 84 of the worm wheel 83 in the radial direction. A front end of the small cylinder 78 is brought into contact with or is brought close to an end surface of the inner ring 427b of the first bearing 427.

The inner ring 427b of the first bearing 427 is sandwiched between a stepped part 89 formed on the outer periphery of the output shaft 13 and a retaining ring 90 engaged with the outer periphery groove of the output shaft 13, and therefore, the output shaft 13 is restrained from moving in the shaft direction with respect to the first bearing 427.

According to the present reference example, when the second housing 425 that is an eccentric housing is rotated with respect to the first housing 424, the center of the worm shaft 20 supported by the first housing 424 and the center of the worm wheel 83 supported by the second housing 425 through the first bearing 427 are relatively moved in response to the rotation of the eccentric engagement section 434 of the second housing 425. Therefore, the center-to-center distance between the worm shaft 20 and the worm wheel 83 can be adjusted, and, as a result, a backlash between tooth surfaces between the worm shaft 20 and the worm wheel 83 can be properly adjusted.

Additionally, the bearing 427 that directly supports the output shaft 13 is arranged to be the only bearing, and therefore, when the center-to-center distance is adjusted, the output shaft 13 is restrained from causing resistance.

The positional relationship between the torque sensor 15 held by the torque sensor holding section 435 and the output shaft 13 is slightly changed in response to an adjustment to the center-to-center distance. However, the torque sensor 15 can be made to become unsusceptible to eccentricity by using, for example, a Hall IC or another noncontact sensor as the torque sensor 15. Consequently, an excellent steering feeling can be obtained through the obtaining of stable assist performance.

Figure 11:
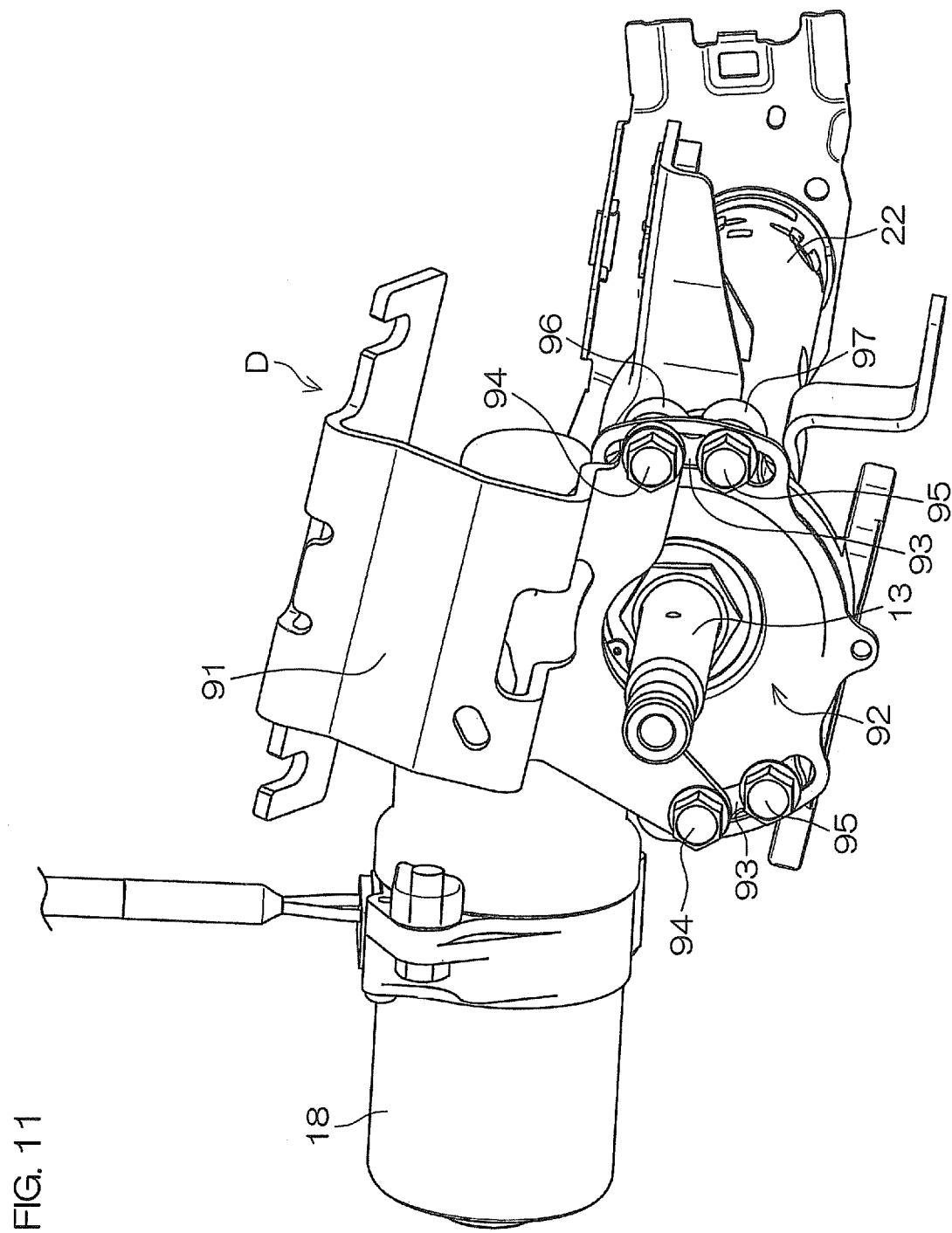
FIG. 11 is a schematic perspective view of a mounting structure to mount a steering column of the electric power steering device onto a vehicle body.

Next, FIG. 11 is a perspective view of a mounting structure D to mount the steering column 22 of the electric power steering device 1 mentioned in each embodiment onto the vehicle body. The mounting structure D includes a vehicle-body-side bracket 91 that is fixed to, for example, a cross member (not shown) of the vehicle body and a column-side bracket 92 that is fixed to one of a pair of housings that are relatively rotated when the center-to-center distance is adjusted (i.e., when the backlash is adjusted).

The column-side bracket 92 has screw through-holes 93 each of which is shaped like a circular arc that centers on the central axis of the output shaft 13. The screw through-holes 93 are provided as a pair. The pair of screw through-holes 93 are disposed at non-symmetrical positions, respectively, that are not point-symmetrical with the output shaft 13 centered, and therefore, the column-side bracket 92 is prevented from being inaccurately attached (i.e., the column-side bracket 92 is attached in a state of being inside out). Additionally, a projection (not shown) that is used to prevent inaccurate assembly may be extended from part of the peripheral edge of the column-side bracket 92.

First and second fixing screws 94 and 95 are inserted through the screw through-holes 93, respectively. The first and second fixing screws 94 and 95 are screwed and fixed to screw holes (not shown) of bosses 96 and 97, respectively, that are formed at the other one of the pair of housings.

The first fixing screw 94 is inserted through a screw through-hole (not shown) shaped into a circular hole of the vehicle-body-side bracket 91 and through the screw through-hole 93 shaped into a long hole of the column-side bracket 92, and is screwed and fixed to a corresponding screw hole. In other words, the first fixing screw 94 fastens together both of the vehicle-body-side bracket 91 and the column-side bracket 92 with respect to the steering column 22.

The present invention is not limited to the above-mentioned embodiments. For example, in each embodiment, the present invention is applied to the electric power steering device (so-called column/assist type electric power steering device) in which a worm wheel is connected to an output shaft of a steering shaft so as to be rotatable together, and yet, without being limited to this, the present invention may be applied to an electric power steering device (a so-called pinion/assist type electric power steering device) in which a worm wheel is connected to a pinion shaft so as to be rotatable together.

Additionally, although the transmitting mechanism is a worm gear mechanism that includes a worm shaft serving as a driving member and a worm wheel serving as a driven member in each embodiment, a parallel-shaft gear mechanism, such as a spur gear mechanism or a helical gear mechanism, may be used instead of a skew gear mechanism, such as a worm gear mechanism. Additionally, the transmitting mechanism may be a belt/pulley mechanism that includes a driving pulley serving as a driving member and a driven pulley serving as a driven member. Additionally, the present invention can be variously modified within the scope of the appended claims.

Although the present invention has been described in detail according to the concrete embodiments, skilled persons that have understood the above-mentioned contents will easily think of its alternatives, modifications, and equivalents. Therefore, the present invention should be regarded as falling within the scope of the appended claims and the scope of the equivalents.

The present application corresponds to Japanese Patent Application No. 2009-298343 filed in the Japan Patent Office on Dec. 28, 2009, and the entire disclosure of the application is incorporated herein by reference.

DESCRIPTION OF SIGNS

1 . . . Electric power steering device, 2 . . . Steering member, 3 . . . Steering shaft, 12 . . . Input shaft, 13 . . . Output shaft, 14 . . . Torsion bar, 15 . . . Torque sensor, 18 . . . Electric motor, 19; 119; 419 . . . Transmitting mechanism, 20 . . . Worm shaft (Driving member), 21; 63 . . . Worm wheel (Driven member), 22 . . . Steering column, 24; 224 . . . First housing, 25; 125; 225 . . . Second housing, 27 . . . First bearing, 227 . . . First bearing (Only bearing), 28 . . . Second bearing, 33; 233 . . . First bearing holding section, 34; 234 . . . Eccentric engagement section, 36; 236 . . . Engagement section, 37; 53 . . . Second bearing holding section, 52 . . . Third housing, S; S1 . . . Gap

The invention claimed is:

1. An electric power steering device comprising:
   a steering shaft that includes an input shaft connected to a steering member, an output shaft connected to a steerable mechanism, and a torsion bar through which the input shaft and the output shaft are connected together;
   a torque sensor that detects steering torque loaded onto the steering shaft;
   an electric motor that is controlled based on an output of the torque sensor;
   a transmitting mechanism that includes a driving member and a driven member and that decelerates and transmits output rotation of the electric motor to the output shaft;
   a first bearing that rotatably supports the output shaft;
   a first housing that supports the first bearing; and
   a second housing that rotatably supports the driving member;
   wherein the driven member is rotatable together with the output shaft, the first housing includes a first bearing holding section that holds the first bearing, an eccentric engagement section that is eccentric with respect to the first bearing holding section such that a center of the eccentric engagement section is radially offset from a center of the first bearing holding section, and a torque sensor holding section that holds the torque sensor,
   the torque sensor holding section is concentric with the first bearing holding section,
   the second housing includes an engagement section fitted to the eccentric engagement section, and
   the eccentric engagement section of the first housing is arranged to be rotated with respect to the engagement section of the second housing when a center-to-center distance between the driving member and the driven member is adjusted.

2. The electric power steering device according to claim 1, further comprising a second bearing that rotatably supports the output shaft,
   wherein the second housing includes a second bearing holding section that holds the second bearing, and
   a gap that allows the second bearing to move in a radial direction with respect to the second housing when the center-to-center distance is adjusted is formed between the second bearing holding section of the second housing and the second bearing.

3. The electric power steering device according to claim 2, further comprising a lock member capable of fastening an outer ring of the second bearing to the second bearing holding section.

4. The electric power steering device according to claim 1, further comprising:
   a second bearing that rotatably supports the output shaft; and
   a third housing that includes a second bearing holding section holding the second bearing;
   wherein a gap that allows the second bearing to move in a radial direction with respect to the second housing when the center-to-center distance is adjusted is formed between the second housing and the third housing.

5. The electric power steering device according to claim 1, wherein the first bearing includes an only bearing that directly supports the output shaft.

* * * * *